United States Patent [19]

Cerciello et al.

[11] Patent Number: 5,629,938
[45] Date of Patent: May 13, 1997

[54] METHOD FOR AUTOMATED PROVISIONING OF DEDICATED CIRCUITS

[75] Inventors: John A. Cerciello, Coplay, Pa.; Stephen E. Hanson, Edgewood, Md.; David G. Priest, Budd Lake, N.J.

[73] Assignee: AT&T, Middletown, N.J.

[21] Appl. No.: 449,984

[22] Filed: May 25, 1995

[51] Int. Cl.$^6$ .............................. H04L 12/56; H04M 7/00
[52] U.S. Cl. ........................ 370/384; 370/398; 379/220; 379/90
[58] Field of Search .................. 370/60, 13, 110.1, 370/60.1, 68.1, 94.3, 94.2, 100.1, 82; 379/220, 201, 219, 244, 207; 395/200.15, 200.02

[56] References Cited

U.S. PATENT DOCUMENTS

| | | | |
|---|---|---|---|
| 5,138,657 | 8/1992 | Colton et al. | 379/220 |
| 5,295,139 | 3/1994 | Palmer | 370/60 |
| 5,353,339 | 10/1994 | Scobee | 379/201 |
| 5,390,179 | 2/1995 | Killian et al. | 370/110.1 |
| 5,491,742 | 2/1996 | Harper et al. | 379/201 |
| 5,513,171 | 4/1996 | Ludwiczak et al. | 370/13 |

*Primary Examiner*—Wellington Chin
*Assistant Examiner*—Melissa Kay Carman
*Attorney, Agent, or Firm*—Robert B. Levy

[57] ABSTRACT

Automatic provisioning of dedicated circuits (40, 44, 48, 49, 55, 56, 64, 68, 72, and 74) within a network (10) to obtain connectivity of a prescribed bandwidth between an origin (12) and an end point (16) is accomplished by first identifying circuits having a prescribed bandwidth and suitable location from a map of such circuits maintained in a data base (80). Once the circuits having the prescribed bandwidth and suitable location are identified, then a group of circuits is selected, based on one or more predetermined criteria. Thereafter, provisioning commands are generated for receipt by Digital Access Cross-Connect Devices (42, 46, 50, 54, 58, 62, 66 and 73) that interconnect the circuits to provide the desired conductivity between the origin and the end point.

24 Claims, 1 Drawing Sheet

METHOD FOR AUTOMATED PROVISIONING OF DEDICATED CIRCUITS

TECHNICAL FIELD

This invention relates to a technique for automatically provisioning dedicated circuits within a network to establish conductivity of a prescribed bandwidth between an origin and an end point.

BACKGROUND ART

Telecommunications traffic (e.g., voice and dam) typically originates at one end of a communications channel that is maintained either by a Local Exchange Carrier (LEC) or a Competitive Access Provider (CAP). If the destination of such telecommunications traffic is within the area served by the LEC or CAP, then that carrier or the combination of carriers transports the traffic over their circuits to the intended destination. However, if the destination of such traffic is, outside the service area of the LEC or CAP, then the carrier or combination of carriers transports the traffic to an Inter-Exchange Carrier (IXC), such as AT&T. The IXC transports the traffic over its network to a LEC or CAP serving the intended destination of such traffic.

For such traffic to be successfully transported, the carriers (i.e., the LEC and/or CAP and the IXC) collectively must provide conductivity (i.e., a completed transmission path) between the origin and end point of the traffic. For many industrial and commercial telecommunication subscribers, such conductivity is provided by interconnected circuits within the LEG and/or CAP and the IXC that have one or more channels that are dedicated to that subscriber. The number and nature of the circuits generally depend on the bandwidth required for the traffic being transmitted.

The process of selecting and interconnecting individual circuits to yield a completed transmission path is known in the an as provisioning. In the past, the process of provisioning dedicated circuits has been very laborious. When a subscriber needs a transmission path of a particular bandwidth, the subscriber generally makes the request to its primary communication carrier (either a LEC, CAP or IXC) nominally responsible for providing end-to-end transport. For example, if an IXC is the primary carrier, then it arranges with the appropriate LECs and/or CAPs to provide the necessary dedicated circuits within their respective networks to transport the traffic originating at the subscriber to the IXC and then from the IXC to the intended recipient. Invariably, delays occur between receipt of the subscriber's request for service and the provisioning by each carrier of its circuits dedicated to that subscriber. Indeed, several days or even several weeks may elapse before all of the carriers have provisioned the necessary circuits. In many instances, the subscriber may have critical deadlines, making such long delays intolerable.

Thus, there is a need for a method for provisioning dedicated circuits more rapidly.

BRIEF SUMMARY OF THE INVENTION

Briefly, in accordance with a preferred embodiment of the invention, a method is provided for automatically provisioning dedicated circuits (including at least one channel in each circuit) in a network. Each circuit (and each channel therein) is presumed to have a known location in the network and a known bandwidth. Further, each circuit is assumed to be connectable to at least one other circuit in response to a provisioning command associated with that circuit. The method of the invention is initiated by providing a record of each individual circuit, the record specifying the location and bandwidth of each circuit as well as whether the circuit is available. When practicing this invention, a single carrier (either a LEC, CAP, or IXC) typically maintains the records for all circuits, including its own circuits, as well as those of other carriers that are available for dedication. Upon receipt of a request for conductivity of a prescribed bandwidth, each circuit that is available for dedication, that has the prescribed bandwidth, and that has a suitable location, is identified. (A circuit having a suitable location is a circuit whose location within the network allows it to be interconnected with one or more other circuits to provide the desired conductivity.) Once all of the available circuits having the proper bandwidth and suitable location are identified, then a group of such identified circuits is selected for interconnection. Thereafter, provisioning commands are generated for interconnecting the selected circuits to provide the requested conductivity. In practice, each provisioning command controls a Digital Access Cross-Connect Device (DACD), such as a Digital Access Cross-Connect System, a Synchronous Optical Network (SONET) ring or an Asynchronous Transport Mode (ATM) switch, that couples one circuit to another to facilitate coupling of at least one channel in each circuit to at least one other channel in the other circuit.

As compared to past approaches, the above-described method accomplishes provisioning very rapidly because the entire process can be carried out automatically. All of the record keeping, circuit identification, circuit selection and interconnection steps can be accomplished very quickly with the aid of one or more computers, thereby minimizing any delay between receipt of a provisioning request and actual provisioning of circuits within the combined IXC, LEC and CAP network. Indeed, with the above-described method, the customer itself could carry out provisioning by appropriately providing a provisioning request directly to the computer(s) controlling the provisioning process. Moreover, the above-described method also affords the opportunity to efficiently audit a network of dedicated circuits and to re-provision the network as needed to assure greatest efficiency in terms of continuously maintaining the shortest-length route between the origin and end point.

DETAILED DESCRIPTION

Figure 1:
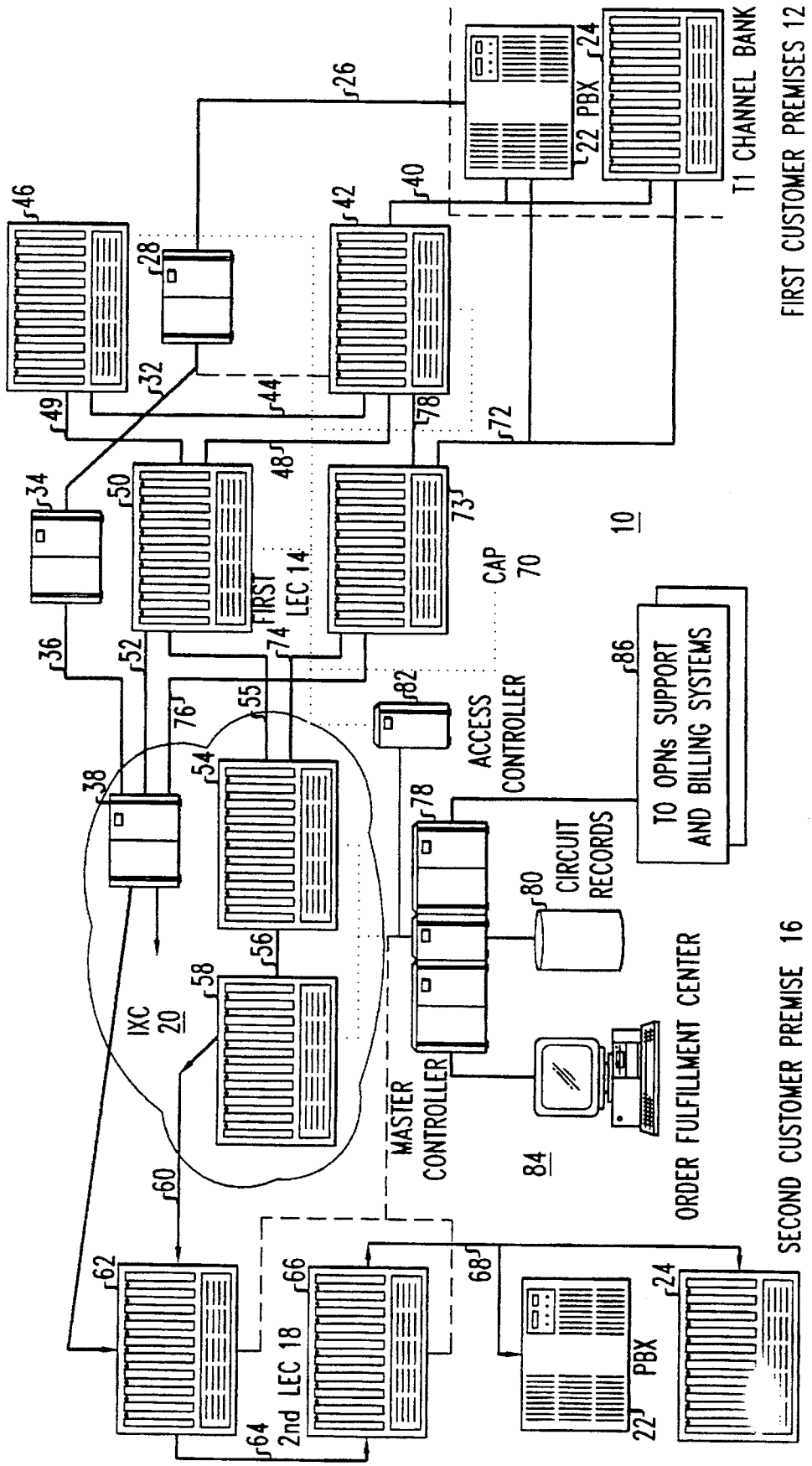
FIG. 1 is a block schematic diagram of a combined telephone network that may be provisioned in accordance with the method of the invention.

FIG. 1 illustrates a block schematic diagram of a combined telephone network 10 for carrying telecommunications traffic between a first customer premises 12 (i.e., an origin), served by a first Local Exchange Carrier (LEG) 14, and a second customer premises 16 (i.e., an end point), served by a second LEC 18 physically separated from the first LEC 14. (As will be explained in greater detail below, either or both customer premisess may be served by a Competitive Access Provider (CAP) as well.) An Inter-Exchange (IXC) carrier 20, such as AT&T, typically carries inter-exchange traffic between the LECs 14 and 18. It should be understood that intra-LEC traffic may be carded by the originating LEC alone, or in combination with the IXC, assuming that local tariffs permit the IXC to carry toll calls within the LEC's local access telephone area (LATA).

In the illustrated embodiment of FIG. 1, telecommunications traffic originates from the first customer premises 12 by way of a PBX 22 and/or a T1 Channel bank 24, the latter consolidating data from one or more devices, such as computers or the like (not shown), at the customer premises. It should be understood that there may be other types of telecommunications equipment at the first customer premises 12 in addition to, or in place of, the PBX 22 and/or the T1 channel bank 24. For simplicity purposes, the second customer premises 16 also includes a PBX 22 and/or a T1 channel bank 24 although other equipment, in addition to, or in place of, the PBX and/or T1 channel bank may be present.

The PBX 22 at the first customer premises 12 is typically connected to the LEC 14 via one or more channels in a first circuit 26, having a bandwidth of T1 or above, and terminating at a telephone switch 28, typically an AT&T 5ESS telephone switch. The switch 28 is located at a local switching office of the LEC 14 serving the first customer premises 12. In this way, the first customer premises 12 receives switched telephone service. (Although not shown, the PBX 22 at the second customer premises may similarly receive switched service in the same manner from the LEC 18.)

The switch 28 at the local service office of the LEC 14 switches the traffic received from the first customer premises 12, either within the local service office, or within the first LEC 14, if the traffic is local. To that end, one or more channels in a circuit 32 of at least T1 bandwidth couple the first switch 28 to a second local exchange switch 34 located at a serving wire center of the LEC 14. Depending on the destination of the traffic, the second switch 34 switches the traffic received from the switch 28 to another local service office, or if the traffic is bound for another LEC, to the IXC 20. For that reason, the switch 34 is coupled by one or more channels in a circuit 36, of at least T1 bandwidth, to a gateway toll switch 38 maintained by the IXC 20 at a "Point of Presence" (POP) within the LATA, which, in the illustrated embodiment, is chosen as the serving wire center of the LEC 14. The gateway toll switch 38 switches the traffic on the circuit 36 to another toll switch (not shown) maintained by the IXC 20 so that the traffic ultimately can be switched to the LEG 18 or to another LEC.

In practice, the channels within the circuits 32 and 36 are not dedicated to any one customer. Thus, while a given channel in one of the circuits 32 and 36 may carry traffic from the PBX 22 at the first customer premises 12 during one interval, the same channel may carry traffic from a different customer at a different interval. For certain types of traffic, this arrangement is satisfactory. However, for other types of traffic, there are advantages to having one or more dedicated channels connecting the first customer premises 12 to the second customer premises 16. The architecture associated with such dedicated channels will be discussed below.

In the illustrated embodiment, the PBX 22 and the T1 Channel bank 24 at the first customer premises 12 may be coupled by one or more dedicated channels in circuit 40 of at least T1 bandwidth to a first Digital Access Cross-Connect Device (DACD) 42, such as a Digital Access Cross-Connect System, a Synchronous Optical Network (SONET) ring or an Asynchronous Transport Mode (ATM) switch, for switching at least one channel in one circuit to at least one channel in another circuit. Typically, the DACD 42 is located at the local service office of the LEC 14 and is coupled by a multi-channel circuit 44 of at least T1 bandwidth to a second DACD 46 that may be located the same local service office or at a different office. The DACDs 42 and 46 are coupled via multi-channel circuits 48 and 49, respectively, both of at least T1 bandwidth, to a DACD 50 at the LEG 14 serving wire center. A multi-channel circuit 52 of at least T1 bandwidth couples the DACD 50 to the gateway toll switch 38 at the IXC 20. The DACD 50 is also coupled to a DACD 54 at the IXC 20 via a multi-channel circuit 55 of at least T1 bandwidth, and preferably, a T3 circuit or Synchronous Optical Network (SONET) ring. The DACD 54, is coupled via a multi-channel circuit 56 of the same bandwidth as the circuit 55 to another DACD 58 maintained by the IXC 20. A multi-channel circuit 60 of at least T1 bandwidth couples the DACD 58 to a DACD 62 at the serving wire center of the second LEC 18. The DACD 62 is coupled by a multi-channel circuit 64 of at least T1 bandwidth to the DACD 66 at the local service office of the LEC 18 that serves the customer premises 16. The DACD 66 is coupled to the PBX 22 and the T1 channel bank 24 at the second customer premises 16 via one or more channels in a multi-channel circuit 68 of at least T1 bandwidth.

The DACDs 42, 46, 50, 54, 58, 62 and 66 each typically comprise a Digital Access Cross-Connect System manufactured by AT&T that operates to transfer individual input channels to different output channels in response to corresponding control (provisioning) commands. As an example, the DACD 42 may switch one or more of the channels of the circuit 40 to one or more different channels of each of the circuits 44 and 48. In many instances, it is desirable to switch channels between different circuits because one or more individual channels of a given circuit may be defective from the standpoint of being unable to provide adequate conductivity, or may be incapable of carrying traffic above a particular bandwidth. Thus, the DACDs 42, 46, and 50 collectively afford the ability to provision dedicated circuits within the LEC 14 relatively easily, whereas the DACDs 54 and 58 afford the IXC 20 the ability to provision its dedicated circuits. Similarly the DACDs 62 and 66 allow the second LEG 18 the ability to provision its dedicated circuits.

As seen in FIG. 1, a Competitive Access Provider (CAP) 70 may provide one or more dedicated circuits between the customer 12 premises and the IXC 20 in place of, or in addition to, the LEG 14. (Although not shown, a CAP may also provide one or more dedicated circuits between the customer premises 16 and the IXC 20 in place of, or in addition to, the LEG 18.) As seen in FIG. 1, the CAP 70 provides conductivity from the PBX 22 and the T1 channel bank 24 at the customer premises 12, via one or more channels in a circuit 72, to a DACD 73 at the CAP. The DACD 73 functions identically to the previously described DACDs and serves to switch one or more of the channels on the circuit 72 to one or more channels on each of a pair of circuits 74 and 76. The circuits 74 and 76 run from the DACD 73 to the DACD 54 and gateway toll switch 38, respectively, at the IXC 20. The DACD 73 may also be linked via a multi-channel circuit 77 to the DACD 42 at the local service office of the LEC 14.

In the past, provisioning of the above-described dedicated circuits within the collective network 10 linking the Customer premises 12 to the customer premises 16 has been the responsibility of the carrier maintaining the individual circuits. Thus, for example, provisioning of the dedicated circuits 40, 44, 48, and 49 has been the responsibility of the LEC 14 whereas provisioning of the circuits 55, 56, 60 and 74 has been the responsibility of the IXC 20. By the same token, the responsibility of provisioning the circuit 72 lies with the CAP 70.

In most instances, a customer seeking conductivity between the customer premises 12 and the customer premises 16 will typically contract with a single primary carrier (either a LEC, an IXC or a CAP.) The primary carrier assumes the responsibility for arranging with other carriers for them to provision their circuits as needed so the carriers collectively provide the desired conductivity. In the past, coordination among the various carriers has been time consuming for the primary carrier, thus preventing it from responding quickly to a customer request to change its current service, e.g., to obtain higher bandwidth conductivity for a brief interval because of a special need. In an effort to partially overcome this problem, some LECs now offer a tariffed service whereby a customer can provision its dedicated circuits within that LEC by providing provisioning commands to the DACDs associated with the customer's dedicated circuits. The ability to provision in this fashion eliminates the delays previously incurred by waiting for the LEC to accomplish provisioning in response to receipt of a request for a change in service. However, a customer seeking a change in service still must coordinate such a change with all of the carriers responsible for providing service, often a daunting task.

In accordance with the invention, a technique is provided for automatically accomplishing provisioning to afford rapid response to a customer request for a change in service. The provisioning technique of the invention is practiced with the aid of a master controller 78 that typically takes the form of a computer or bank of computers coupled to a data base 80, typically, a magnetic storage device, such as a magnetic disk or tape drive. The data base 80 contains records (e.g., a map) of all of the circuits in the combined network 10. For each circuit, the data base 80 maintains a record of both the bandwidth and the location of each circuit, as well as its availability. The data base 80 may contain other information about each circuit, such as its length, its cost (i.e., the amount charged by the carrier for that circuit), and the reliability of the circuit. Thus, with regard to the circuit 44 maintained by the LEC 14, the data base 80 contains information regarding the bandwidth (i.e., number of channels) of that circuit, as well as its location, that is, the two points (i.e., the DACDs 42 and 46) between which the circuit is connected. The cost for the circuit 44, as well as its length, and its reliability may also be stored in the data base 80.

Associated with the master controller 78 is an access controller 82, typically one or more computers or programmable controllers (only one shown), coupled to each of the DACDs 42, 46, 50, 54, 58, 62, 66 and 73, as indicated by the dashed line between each DACD and the access controller. As will be discussed below, the access controller 82 is responsive to commands from the master controller 78 and serves to generate and supply provisioning commands to the DACDs 42, 46, 50, 54, 58, 62, 66 and 73 to cause each DACD to appropriately map the channels in the circuits coupled to it to provide conductivity between the first customer premises 12 and the second customer premises 16. In this way, provisioning of the dedicated circuits within the network 10 can be accomplished automatically.

Automated provisioning is accomplished, in accordance with the invention, in the following manner. Initially, a request is made for conductivity of a specified bandwidth between the customer premises 12 and the customer premises 16 or such other locations as specified. Typically, a customer requesting a change in service makes that request to an order fulfillment center 84 coupled to the master controller 78 that is maintained by the customer's primary carrier. The customer may make the request manually, by a letter, fax or phone call. Alternatively, the customer may make the request electronically by sending appropriate commands to the order fulfillment center 84 through the network 10.

Indeed, the customer may not make a provisioning request at all in order for the master controller 78 to initiate provisioning. Rather, the primary carrier, or one of the other carriers, may initiate the request upon detecting a complete or partial failure of one or more of the dedicated circuits providing conductivity between the customer premises 12 and 16. (A circuit failure is deemed to include both a complete failure (no conductivity) or a partial failure such as excessive noise, reduced bandwidth or impaired signal quality.) Moreover, the master controller 78 may initiate provisioning itself on an ongoing basis as a result of continuously auditing the network 10 to assure maximum efficiency in terms of optimum routing. For example, as a result of an audit of the network 10 at a particular instant in time, the master controller 78 may determine that a first set of interconnected circuits could be substituted for second set to provide a transmission path having a reduced length, thereby achieving greater network efficiency.

In response to a request received at the order fulfillment center 84 (or in response to an internally generated request as the result of an audit of the network 10), the master controller 78 accesses the data base 80 to examine the records of the circuits in the collective network maintained by the LECs 14 and 18, the CAP 70 and the IXC 20 as a first step in providing the needed conductivity between the customer premisess 12 and 16. Upon examination of the circuit records within the data base 80, the master controller 78 first identifies those circuits that are: (1) available, (2) have a requisite bandwidth, and (3) have a suitable location. As mentioned previously, a circuit has a suitable location if it lies between an appropriate pair of DACDs to permit the circuit, or at least one or more channels therein, to be interconnected with other circuits to provide the needed conductivity between the customer premises 12 and 16, or such other origin and end point as desired. As an example, the circuit 64 has a suitable location for purposes of providing conductivity between the customer premises 12 and 16. However, if conductivity were to be established between the customer premises 12 and a customer premises (not shown) served by a LEC other than LEC 18, then the circuit 64 probably would not be suitably located. Depending on the network 10 and the traffic carried thereby, it may be that all of the circuits are deemed available, and thus, it may only be necessary to identify those circuits that have the proper bandwidth and suitable location.

Once the master controller 78 has identified those available circuits that have the requisite bandwidth and have suitable locations, then the master controller selects from the identified circuits a group of circuits for interconnection to provide the needed conductivity. For example, in response to the initial request, the master controller 78 may identify the circuits 40, 44, 48, 49, 55, 56, 60, 64, 68, 72 and 74 as being: (a) available, (b) having the requisite bandwidth, and (c) having suitable locations to provide the needed conductivity between the customer premises 12 and 16. From this set of circuits, the master controller may select circuits 56, 60, 64, 68 72, and 74 for interconnection to each other.

Different criteria may be employed by the master controller 78 to determine the identified circuits that are ultimately selected. For example, one criterion may be cost. Among the identified circuits, the master controller 78 may choose those having the lowest cost. In addition to, or in place of, the cost criterion, the master controller 78 might select circuits that have the shortest length. Other factors, such as the reliability of the circuit, may be employed to influence the selection process as well.

After selecting a group of circuits, the master controller 78 generates commands for receipt by the access controller 82 to provision (i.e., interconnect) the selected circuits. In response to the commands from the master controller 78, the access controller 82 supplies commands to the appropriate DACDs to accomplish the desired conductivity. Thus, if the master controller 78 has selected the circuits 72, 74, 56, 60, 64 and 68, then the access controller provides the necessary commands to the DACDs 73, 54, 58, 62, and 66 to suitably interconnect one or more channels in each selected circuit to another channel in another circuit.

In addition to providing the provisioning commands to the various DACDs, the master controller 78 also updates the data base 80 to reflect that the selected circuits, or at least certain channels of such circuits, have now been dedicated to a particular customer and are no longer available. Thus, in response to a new request, the master controller 78 will be prevented from identifying circuits (or channels in each circuit) in the data base 80 that are no longer available. Further, the master controller 78 may also generate information for receipt at an operations center 86 to facilitate operations support and billing. Most telecommunications carriers impose a charge for each circuit in proportion to its bandwidth. Thus, if the master controller 78 has just provisioned a customer's dedicated circuits to provide greater bandwidth, then the billing for that customer should reflect any increased costs. Administrative information associated with such provisioning may also be provided by the master controller 78 to the operations center 86.

The foregoing describes a method for accomplishing automatic provisioning of dedicated circuits in a network 10. Such provisioning is carried out automatically by maintaining a map of the network in the data base 80, in terms of the location and bandwidth of each circuit. Using the map, appropriate circuits are identified and then interconnected by providing appropriate control signals to the various DACDs to achieve the desired conductivity without any manual intervention.

It is to be understood that the above-described embodiments are merely illustrative of the principles of the invention. Various modifications and changes may be made thereto by those skilled in the art which will embody the principles of the invention and fall within the spirit and scope thereof.

What is claimed is:

1. A method for automatically provisioning dedicated circuits within a network, each circuit having a location and a bandwidth and each circuit being selectable for connection in response to a provisioning command, to yield connectivity of a prescribed bandwidth between an origin and an end point, comprising the steps of:

maintaining a record for each individual circuit specifying its location and its bandwidth and at least one of the following data: length, cost and reliability;

automatically identifying those circuits that have the prescribed bandwidth and a suitable location in response to a need for connectivity of a prescribed bandwidth between the origin and the end point;

selecting from among the identified circuits, a group of circuits for interconnnection to each other based on at least one of said circuit length, cost and reliability data specified in said circuit records and automatically supplying provisioning commands to accomplish interconnection of the circuits in the group to provide connectivity between the origin and the end point.

2. The method according to claim 1 wherein the record of each circuit further includes information as to the cost of each circuit.

3. The method according to claim 1 wherein the circuits in the group are selected based on their cost.

4. The method according to claim 1 wherein each record contains information about the reliability of each circuit.

5. The method according to claim 4 wherein the circuits in the group are selected based on their reliability.

6. The method according to claim 1 wherein each record contains information about the length of each circuit.

7. The method according to claim 6 wherein the circuits in the group are selected based on length.

8. The method according to claim 1 wherein each provisioning command controls a Digital Access Cross-Connect Device that selectively interconnects a pair of circuits.

9. A method for automatically provisioning dedicated circuits within a network, each circuit having a location, a bandwidth and an availability for use, and each circuit being selectable for connection in response to a provisioning command, to yield connectivity of a prescribed bandwidth between an origin and an end point, comprising the steps of:

maintaining a record for each individual circuit specifying its location, its bandwidth, its availability for use and at least one of the following data: length, cost and reliability;

automatically identifying circuits that are: (a) available for use, (b) have the prescribed bandwidth and (c) have a suitable location in response to a need for connectivity of a prescribed bandwidth between the origin and the end point;

selecting, from among the identified circuits, a group of circuits for interconnection to each other based on at least one of said circuit length, cost and reliability data specified in said circuit records; and automatically supplying provisioning commands to interconnect the circuits in the group to provide connectivity between the origin and the end point.

10. The method according to claim 9 wherein the record of each circuit further includes information as to the cost of each circuit.

11. The method according to claim 10 wherein the circuits in the group are selected based on their cost.

12. The method according to claim 9 wherein each record contains information about the reliability of each circuit.

13. The method according to claim 12 wherein the circuits in the group are selected based on their reliability.

14. The method according to claim 9 wherein each record contains information about the length of each circuit.

15. The method according to claim 14 wherein the circuits in the group are selected based on their length.

16. The method according to claim 9 wherein each provisioning command controls a Digital Access Cross-Connect Device that selectively interconnects a pair of circuits.

17. A method for automatically provisioning dedicated circuits within a network, each circuit having a location and a bandwidth and each circuit being selectable for connection in response to a provisioning command, to yield connectivity of a prescribed bandwidth, between an origin and an end point, comprising the steps of:

maintaining a record for each individual circuit specifying its location and its bandwidth and data specifying at least one of the following: circuit length, cost and reliability;

auditing the network to determine if provisioning is necessary to achieve greater efficiency, and if so, then:

(i) automatically identifying those circuits that have the prescribed bandwidth and a suitable location to provide connectivity of a prescribed bandwidth between the origin and the end point;

(ii) selecting, from among the identified circuits, a group of circuits for interconnection to each other based on at least one of said circuit length, cost and reliability data specified in said circuit records; and (iii) automatically supplying provisioning command to accomplish interconnection of the circuits in the group to provide connectivity between the origin and the end point.

18. The method according to claim 17 wherein the record of each circuit further includes information as to the cost of each circuit.

19. The method according to claim 18 wherein the circuits in the group are selected based on their cost.

20. The method according to claim 17 wherein each record contains information about the reliability of each circuit.

21. The method according to claim 20 wherein the circuits in the group are selected based on their reliability.

22. The method according to claim 17 wherein each record contains information about the length of each circuit.

23. The method according to claim 22 wherein the circuits in the group are selected based on their length.

24. The method according to claim 17 wherein each provisioning command controls a Digital Access Cross-Connect Device that selectively interconnects a pair of circuits.

* * * * *